United States Patent

[11] 3,599,398

[72] Inventors Walter Jaeger;
 Theo H. Keilpart, both of Laval des Rapides, Quebec, Canada
[21] Appl. No. 1,971
[22] Filed Jan. 12, 1970
[45] Patented Aug. 17, 1971
[73] Assignee Ovitron Coporation
 Newburgh, N.Y.
 Continuation of application Ser. No. 693,002, Dec. 22, 1967, now abandoned.

[54] METHOD AND APPARATUS FOR SEPARATING FOREIGN MATTER FROM GASES
16 Claims, 7 Drawing Figs.

[52] U.S. Cl. .................................................. 55/84, 55/220, 239/517, 261/111
[51] Int. Cl. ................................................... B01d 47/10
[50] Field of Search ........................................ 55/73, 89, 83—85, 93, 220, 223, 257; 239/517, 555, 601; 261/111

[56] References Cited
UNITED STATES PATENTS

| 3,375,058 | 3/1968 | Petersen et al. | 55/17 |
| 1,246,355 | 11/1917 | Thomas | 239/517 |
| 2,935,375 | 5/1960 | Boucher | 55/84 |
| 3,181,287 | 5/1965 | Rabson | 55/257 |
| 3,339,344 | 9/1967 | Pallinger | 55/90 |
| 3,420,450 | 1/1969 | Bergholm | 55/53 |
| 2,621,722 | 12/1952 | Abrams | 239/555 |
| 3,279,610 | 10/1966 | Scholten et al. | 239/517 |
| 3,399,511 | 9/1968 | Geiringer | 55/84 |

Primary Examiner—Reuben Friedman
Assistant Examiner—Charles N. Hart
Attorney—Hopgood and Calimafde ABSTRACT: A method and device are disclosed for separating entrained dusts and mists from a gaseous stream. The device includes a chamber for receiving a mixture of a suspended washing liquid and the gaseous stream, the chamber having at least one orifice slot passing through the wall thereof, the orifice slot being characterized by an enlarged gas entry portion which extends into the chamber wall and converges into a reduced linear throat portion. The length of the slot along the wall surface is substantially greater than the width opening of the throat portion, means being provided for accelerating the flow of the gaseous mixture through the gas entry portion and out through the throat of said slot. By accelerating the gas mixture through the slot to a speed of about 30 to 200 meters per second, the entrained material is caused to agglomerate into heavier particles which are allowed to fall out of the gas mixture after passing through the throat portion of the slot.

INVENTORS
WALTER JAEGER
THEO H. KEILPART

INVENTORS
WALTER JAEGER
THEO H. KEILPART
BY
Hopgood & Calimafde
ATTORNEYS 3,599,398

METHOD AND APPARATUS FOR SEPARATING FOREIGN MATTER FROM GASES

This application is a continuation of Ser. No. 693,002 filed Dec. 22, 1967 and now abandoned.

BACKGROUND

The invention relates to a method and device for the separation and/or recovery of very fine mists and dust particles from a gaseous stream, and has a particular utility in the chemical processing industries and in the field of air pollution.

The field of air pollution is a major national problem. A pollutant which presents a particular problem is sulfur dioxide. Much of this form of sulfur comes from the burning of fossil fuels for heat and power, and, thus, is particularly prevalent in large cities. There is considerable evidence that sulfur dioxide pollution is hazardous to the upper respiratory tract and cases in recent years have been documented involving highly industrialized areas where atmospheric sulfur contamination has caused great discomfort and illness among the populace. It will be thus appreciated that the removal of the sulfur dioxide would be highly beneficial in this regard.

Many devices have been developed for the separation and/or recovery of particles and mists suspended in air or other gases. By the term "particles" is meant finely divided solids, and by the term "mists" is meant finely divided liquids. The term "gases" includes byproducts of fuel combustion, which may contain sulfur in the form of oxides. As particles appear in an almost infinite variety of physical forms, and possess an equal variety of physical and chemical characteristics, prior devices have generally been directed to the removal of particles falling into relatively broad definable categories.

For example, centrifugal separators are commonly used to separate relatively large and heavy particles by hurling them out of the air. The use of cloth filters are known for separating and collecting larger particles in a filter process similar to that of ordinary vacuum cleaners; in which case it is important that the dust be dry.

The smaller the particles become, the more difficult is the task of separation. Electrostatic precipitation has been used to separate smaller particles by first causing them to become negatively charged, then attracting them to a positively charged plate where they may be collected.

Venturi scrubbers have been suggested to separate particles varying in size, including submicron particles. In such separators the particles are accelerated into a stream or spray of water to cause them to agglomerate into larger particles which are more easily separated from the gas stream.

Packed columns have also been suggested for the cleansing of gases. The columns are filled with ceramic or plastic packing of various sizes and shapes, and a washing liquid is passed through the column with the gas. The dust particles are picked up by the liquid which is spread over the multiple surface areas of the packing shapes.

The invention is an improvement over existing separators by providing a novel separator which may be simply and easily constructed, and adjusted to remove particles of a size range greatly in excess of that generally removable by presently known devices. The device provided by the invention is moreover capable of removing dusts and mists and at a high degree of efficiency, and at the same time sulfur dioxide.

Related to the problem of finding a separator that will remove particles of a broad size range are the problems of capacity for removal and the degree of separation efficiency that must be achieved. The device of the invention aids in the solution of these problems in that it can provide a greater overall capacity, and will separate more particles per volume than most of the prior art separators or combination of separators of comparable size.

A further problem confronting present devices is that, in separating smaller particles, clogging frequently occurs and such devices generally cannot easily be cleaned.

The invention overcomes these problems by providing a separator that does not clog when operated to specifications. Moreover, the device may be constructed of corrosive-resistant materials (such as plastics), without impairing its efficiency.

SUMMARY

In their broad aspects, the methods of the invention comprise separating entrained dusts and mists, and in some instances absorption of certain gases from a gaseous stream, e.g. cooling the gaseous stream as required, spraying a liquid into a gaseous stream whereby to form a gas-spray mixture within a confining chamber, accelerating the flow of the gas-spray mixture through an elongated orifice slot, the slot being characterized by an enlarged gas entry portion which converges into a reduced throat portion, the axis of said converging gas entry portion and said throat being coextensively linear, such that the entrained particles, gases and spray liquid are caused to collide and agglomerate into heavier particles, or combine while passing through the reduced linear throat portion, and then allowing the mixture to decrease in speed as it leaves the chamber through the throat portion, whereby to allow the liquid and agglomerated heavier particles to fall out of said mixture.

The device provided by the invention broadly includes a chamber for receiving the gas-spray mixture, at least one elongated orifice slot passing through the wall of the chamber, the orifice slot being characterized by an enlarged gas entry portion which extends in the wall of the chamber and converges into a reduced throat portion, the axis of said converging gas entry portion and said throat being coextensively linear, i.e., line-of-sight. Means may be provided for accelerating the flow of the gas-spray mixture from the chamber through the gas entry portion and out through the throat of the slot. The reduced throat portion is substantially perpendicular to the wall of the chamber. That is to say, the axis of the throat which is coextensive with the axis of the converging gas entry portion of the slot is advantageously substantially perpendicular to the surface of the chamber wall.

An advantageous embodiment of the device of the invention resides in the use of a linear convergent-divergent slot of preferred dimensions, through which the gas-spray mixture is accelerated. By working over such dimensions, optimum results are achieved.

It has been found that the extent and rate of acceleration of the gas-spray mixture comprising exhaust gases contaminants, and washing liquid through the slot have a great bearing upon the degree of separation achieved.

The rate of acceleration is determined by the convergent portion of the slot, and we have found separation to be most effective when the convergent portion of the slot extends for a distance of about one to ten millimeters. We have found that the acceleration desired can be achieved by using a converging slot. A suitable slot is one which has an angle of convergence ranging from 10 to 120° or more advantageously between 80 and 100°. The object is to achieve efficiently maximum acceleration of the gas and entrained material with a minimum loss of energy due to turbulence, friction or like detracting forces.

The extent of the acceleration will be governed by the size of the slot in the area of greatest restriction, i.e. the throat, and the gas velocity before and in the slot. The width of the slot found to be particularly advantageous ranges from about .02 to 3 millimeters, and we have further found that the cross sectional width of the slot at the throat still produces conditions favorable to separation if it is a large multiple of the size of the particles to be separated.

The divergent section at the outlet portion of the slot helps to promote efficient flow through the slot. However, the slot may end at the point of greatest restriction or the throat portion.

No dimensional restrictions are placed upon the length of the area of greatest restriction, the only criteria being that it be achieved at one point in the linear cross section of the slot.

As will be appreciated, it is difficult to predict the optimum dimensions for a slot. Often the size of the particles are not precisely known due to their transient nature. In addition, other physical properties of the particles, mists and gases to be separated which influence their tendency to agglomerate or mix with the washing liquid must also be considered, such as the physical shape of the particles, the surface tension of the mist droplets, and the absorption characteristics of the liquid wash.

Experience has taught that optimum separation is achieved when maximum gas velocity through the slot is between 30 and 200 meters per second. Higher speeds are required when the particles have a lower tendency to agglomerate, and lower speeds are satisfactory when the particles are easily agglomerated.

Because of the multiplicity of variables surrounding the installation of a particular separator, the proper combination of slot dimensions, liquid supply, and acceleration must be varied to provide the most effective combination. However, in accordance with the invention, the desirable dimensions will generally fall within the limitations set forth above, so that by following the teaching of this invention, one can achieve a separator which is highly efficient and less costly to build, and maintain than most presently known devices capable of accomplishing the same result.

The device provided by the invention has the additional advantage of being adjustable to accommodate to changing conditions, such as different fuels or atmospheric conditions requiring a greater degree of efficiency of exhaust purification. For example, by increasing the pressure drop across the slots a greater degree of separation can be achieved.

In the carrying out of the process, the exhaust gases are cooled to below the boiling point of the washing liquid, if required, prior to entering the separator to avoid evaporation of the washing liquid during the separating process. The maximum temperature permissible may also be governed by the materials of construction, e.g. plastics. If necessary, the gases may be cooled in a separate cooling system prior to entering the separator.

Any washing liquid that will keep the slots clear can be used, and may be accordingly selected to combine with the contaminants to produce a usable byproduct.

The dimensions of the slot, the type and amount of fluid used, and the acceleration through the linear throats of the slots are dependent upon the physical characteristics of the particles to be separated and their tendency to agglomerate with the washing liquid. Maximum efficiency is usually achieved by onsite adjustment of the foregoing parameters to produce the desired results under specific operating conditions.

The more resistant the dusts and mists to agglomerate, or combine with the washing liquid, the more narrow the slot opening should be and the greater the acceleration of the mixture through the slot.

The chief advantage of separators constructed according to the dictates of the invention is that they are capable of separating submicron particles, and yet are not subject to clogging as may happen to presently known mechanical separators of such small particles. Loss of efficiency due to clogging has been a major problem with prior devices, so that freedom from clogging represents a substantial improvement over prior art separators.

A further advantage of the invention is that the device is capable of providing conditions for absorbing certain gases from a gaseous stream.

Another advantage of the invention is that the contaminated gases, and the agglomerate produced in their cleansing, do not contact moving parts during the separation treatment.

A further advantage of the invention is that it can be easily constructed of materials resistant to chemically aggressive mists, dust, or gases or the liquid solution thereof.

Other objectives, advantages, and various further features of novelty and invention will be apparent to those skilled in the art from the following specification when taken in conjunction with the accompanying drawings.

DESCRIPTION OF THE PREFERRED EMBODIMENT

Figure 1:
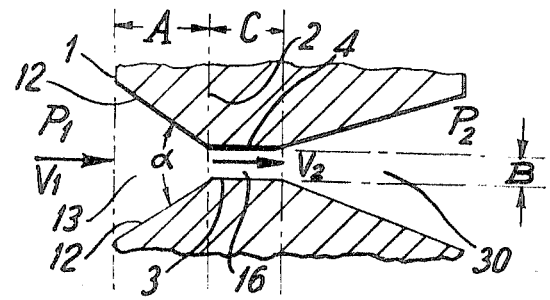
FIG. 1 is a cross-sectional view of one embodiment of the orifice slot provided by the invention.

Referring now to FIG. 1, one embodiment of an orifice slot constructed in accordance with the invention is illustrated. The slot may take a variety of convenient forms; for example, linear slots in a wall, or annular slots between a series of rings. Or the slots may result from the space generated by a helical element. While, in effect, a helix generates one continuous slot, such devices will be considered to have a plurality of multilevel slots. However utilized, it is advantageous that the dimensions of the slots fall substantially within the following range:

1. Length "A", the linear distance from the face 1 of the slot to the beginning of the throat 2, should be between about 1 and 10 millimeters, an advantageous distance being about 3 millimeters, and
2. Width "B", the linear distance between the lower side 3 and the upper side 4, taken at the narrowest section of linear throat "C" formed by sides 3 and 4, should be desirably between about 0.02 and 3 millimeters and more advantageously less than 0.5 millimeters.
3. The angle of convergence $\alpha$ of the convergent section of the slot as above defined ranges generally between about 10 and 120°.

$V_1$ is the velocity of the gas and liquid mixture prior to entering the convergent section or portion 13 of the slot and is generally very small compared to $V_2$. $V_2$ is the maximum velocity achieved by the gas, as it passes through the restricted area 16 of throat "C" of the slot. In operation, the velocity $V_2$ is advantageously maintained over 30 meters/sec., and more advantageously between about 50 and 200 meters/sec., to obtain the desired acceleration from $V_1$ to $V_2$ within distance A to produce the desired effect.

Figure 2:
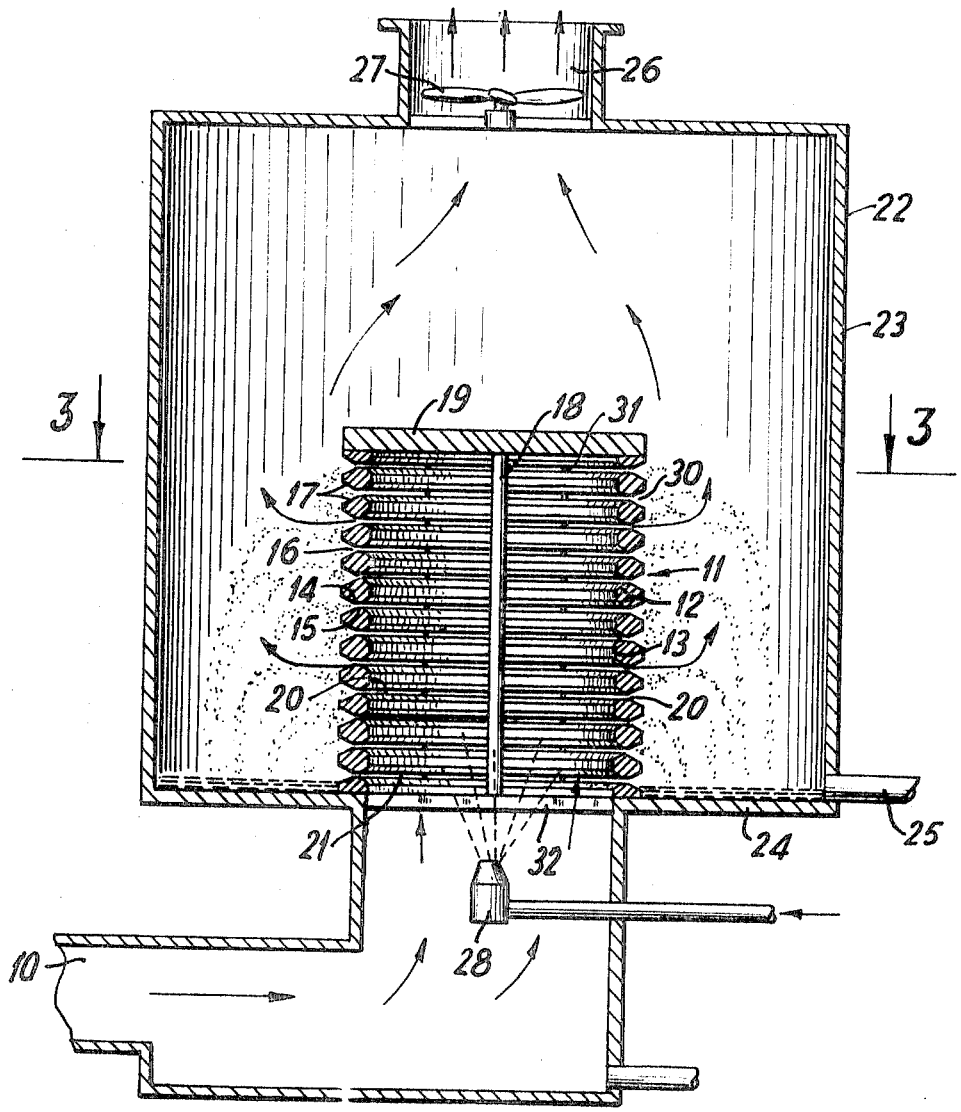
FIG. 2 is a section of elevation of one embodiment of the device of the invention showing a series of adjacent arranged slots.
Figure 3:
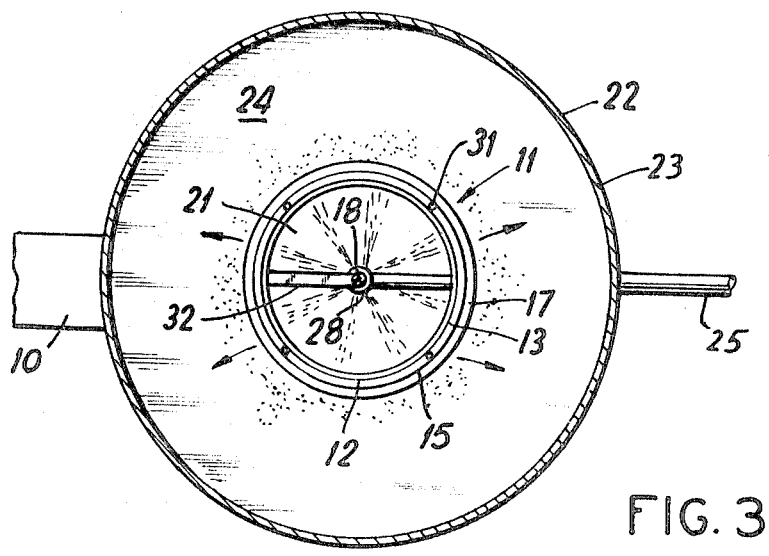
FIG. 3 is a plan view of the device shown in FIG. 2.

FIG. 2 illustrates an embodiment of the invention wherein a series of annular or peripheral slots meeting the above criteria are utilized. As will be appreciated, the slots are elongated, in this instance, circumferential, and are much longer than the width "B" of the slot opening. An inlet duct 10 connects to the open bottom 21 of the inner chamber 11 and introduces the exhaust gas into the separator. The walls of the inner chamber 11 comprise a series of congruent annular elements coaxially aligned one above the other to define a cylindrical chamber.

The inner peripheral edges 12 of each element are beveled resulting in the formation of the convergent section 13 of the slot between adjacent elements. The upper and lower faces of each element have flat portions 14 and 15, respectively, corresponding to flat portions 3 and 4 of FIG. 1 which define a neck or throat 16 between adjacent elements corresponding to throat "C" of FIG. 1.

The outside peripheral edges 17 of the elements are also beveled resulting in the formation of divergent section 30 of the slot when the elements are assembled.

The annular elements may be held in their coaxial spaced apart relationship by any conventional structure such as a series of webs 31 lying between the elements to provide proper spacing, positioning and support. Rod 18 supported at the bottom by cross member 32 holds top 19 tightly atop the elements thus stabilizing the assembly.

The top 19 closes the inner chamber so that the only exit for gases introduced therein by duct 10 is through the annular slots 20 between adjacent elements.

A spray nozzle 28 positioned within the inner chamber 11 provides a means of introducing the washing liquid into the inner chamber in a form which promotes mixing with the exhaust gases.

An annular outer chamber 22 surrounds the inner chamber. The outer chamber is created by an outer annular wall 23, and an annular bottom element 24 to which wall 23 is sealed. A drain 25 is provided at the bottom of the outer chamber to permit the draining off of agglomerated liquid and solid matter which emanates from the slots and settles to the bottom of the outer chamber.

The top of the outer chamber is open, and has a flue 26 through which the cleansed exhaust gases are removed.

The gas flow between the inner and outer chamber is aided by fans or blowers 27 positioned relative to the flue of the outer chamber.

The number of elements utilized in a particular installation is determined by the volume flow of gases through the unit, the density of such gases, and the dimensions of the slot. Using these parameters the required slot exit area for the gases can be calculated by known formulas for volumetric fluid flow, and the required number of slots provided by adding the appropriate number of elements.

In operation, the exhaust gases to be cleansed are introduced into the inner chamber 11 through the intake duct 10. A washing fluid, e.g. water, is introduced through spray nozzle. The gas-liquid or gas-spray mixture is then accelerated through the linear throats of the slots.

The contaminants having less mass than the spray liquid particles are accelerated with the gas flow faster than the liquid spray. This condition causes multiple collicions of the contaminants and the washing liquid droplets resulting in the agglomerate.

The agglomerate resulting from this process is relatively heavy by the time it leaves the slots of the inner chamber, and together with the liquid spray, falls to the bottom of the outer chamber. There the washing liquid picks up the agglomerate and drains off continuously through drain 25.

Figure 4:
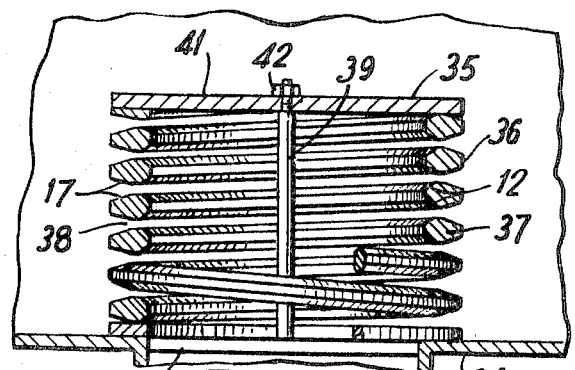
FIG. 4 depicts another form of the device in which the slots are derived from a helix.

FIG. 4 illustrates another embodiment of an orifice assembly or cylindrical chamber 35, the wall 36 of which is defined by a helical element 37, the helical space 38 of which defines slot openings corresponding to those of FIG. 2. As in FIG. 2, the inner and outer peripheral edges of the helix are beveled (note 12 and 17), the beveled portions carrying the same numeral designations. The chamber is supported in position by a tie rod 39 integral with bar 40, the tie rod in turn clamping cover 41 by means of nut 42. As will be apparent, the degree of bias against the natural spring of the helix by the tie rod enables varying the throat of the orifice slot to any desirable width.

Figure 5:
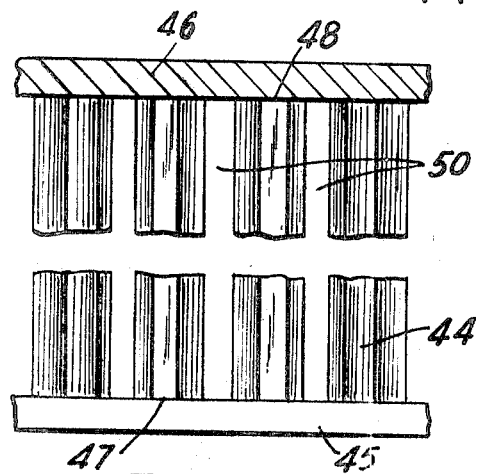
FIGS. 5 and 6 are illustrative of another embodiment of the device.
Figure 6:
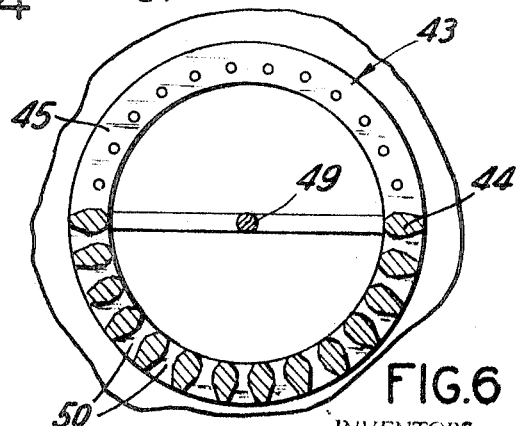

FIGS. 5 and 6 show another embodiment of an orifice assembly comprising a cylinder 43 made up of a plurality of beveled vertical orifice elements or rods 44 arranged between a bottom ring 45 and an upper cover plate 46, the ends of the orifice elements being jointed to the ring and cover plate at 47, 48, respectively, the assembly being held together by tie rod 49. As the beveled elements are adjacently spaced from each other (note FIG. 6), the spaces 50 define the orifice slots as in FIGS. 2 and 4.

Figure 7:
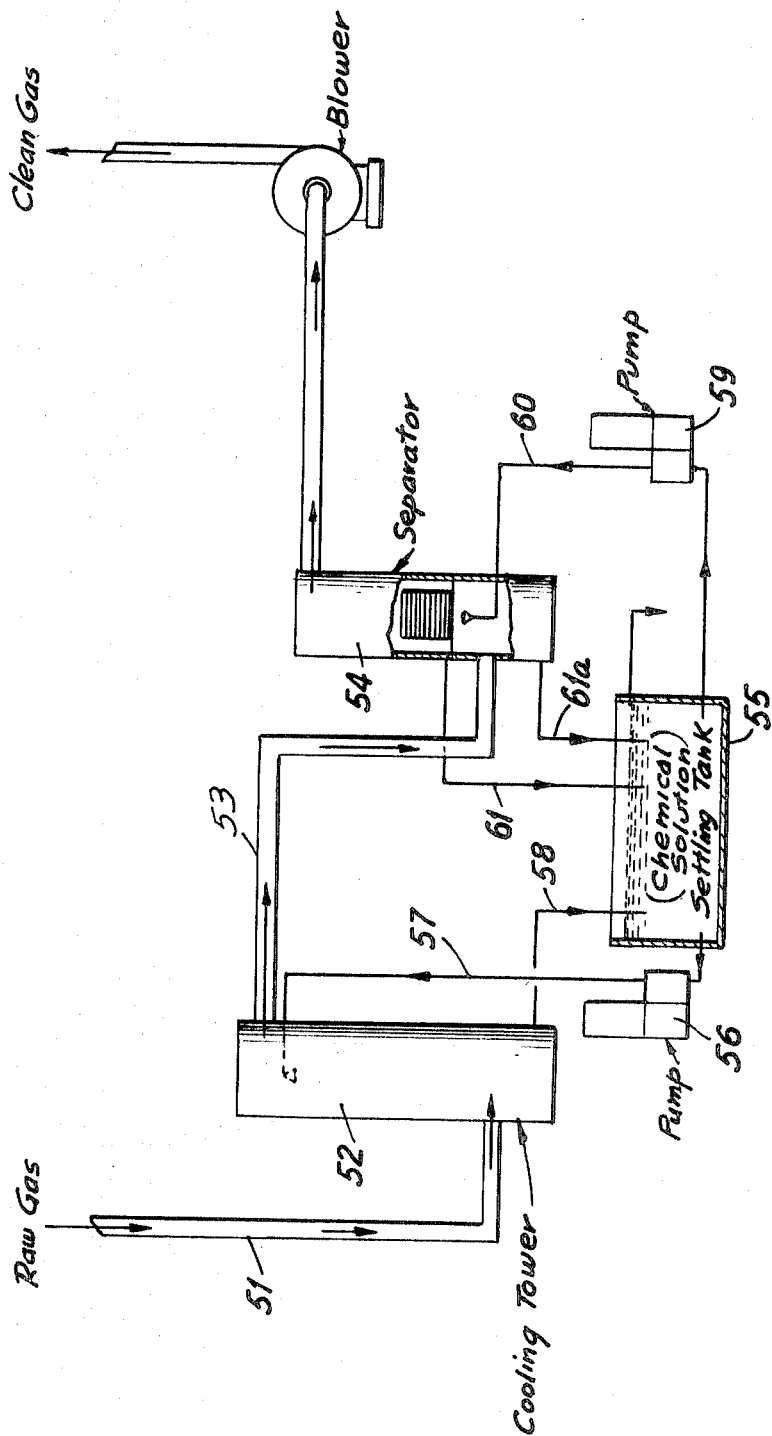
FIG. 7 is a schematic diagram of a system employing the method and apparatus of the invention.

FIG. 7 is a block diagram of a system utilizing the methods and apparatus of the invention. In the illustrated system, the raw gas is conducted through a duct 51 to a cooling tower 52. The gas is then passed through the cooling tower 52 and through duct 53 to a separator 54 of the type described in connection with FIG. 2. A settling tank 55 holds the washing liquid. Pump 56 feeds the liquid to the cooling tower 52 through pipe 57, where it is sprayed over suitable packing. The liquid drains by gravity from the bottom of tower 52 and back to settling tank 55 through pipe 58. Pump 59 feeds the liquid to the separator 54 through pipe 60, where it is utilized as previously described. The liquid and agglomerate from the separator drain by gravity back to the settling tank 55 through pipes 61 and 61a.

To illustrate the operation of the system, tests were conducted as follows:

Coal was burned in a steam boiler, creating a flue gas which had a dust content of about 5 to 10 grams per cubic meter, the average concentration during the test being about 7.4 grams per cubic meter.

The gas was passed through a separator similar to that of FIG. 2 in which the elements of the inner chamber had a wall thickness of 10 mm, and the slots formed therebetween had the following dimensions:

Angle of convergence,—90°
"A" (FIG. 1)—2 mm.
"B" (FIG. 1)—0.5 mm.
"C" (FIG. 1)—2 mm.

Water was the washing liquid, and was recirculated by a pump through a settling tank to allow the separated dust particles to settle out. One gallon of water per minute was sufficient to cleanse an exhaust flow of about 60 cubic feet per minute. The maximum gas velocity in the slot was about 60 meters per second. A single slot was found adequate to accommodate this rate of flow. The dust content of the flue gas after passing through the separator was 0.0133 grams per cubic meter, which indicates a separation efficiency of 89.8 percent. During the gas flow, a pressure difference of 230 millimeters of water was recorded.

With regard to the absorption of sulfur dioxide, during this test it was found that the flue gas contained an average of 0.1047 percent by volume of sulfur dioxide. Sodium hydroxide was added to the water of 30° C. to produce a pH factor of from 5.7 to 5.8. It was found that the sulfur dioxide content of the gas was reduced to 0.0062 percent by volume, a recovery of about 94.1 percent.

While the principles of the invention have been described in connection with the above specific apparatus, it is to be clearly understood that this description is made only by way of example and not as a limitation to the scope of the invention as set forth in the accompanying claims.

We claim:

1. A device for separating entrained dusts and mists from a gaseous stream which comprises:
    a chamber for receiving a mixture of a suspended washing liquid and said gaseous stream,
    a plurality of adjacently spaced elongated orifice slots passing through the wall of said chamber, each of said orifice slots being characterized by an enlarged gas entry portion which extends and converges into a reduced throat of a width of from 0.02 to 3 millimeters, the axis of said converging gas entry portion and said throat being coextensively linear, and the length of the converging gas entry portion terminating at the throat ranging from about 1 to 10 millimeters,
    means for introducing said mixture of suspended washing liquid and said gaseous stream into said chamber equidirectional with respect to all portions of said slots whereby there is no directional tendency of said mixture towards any particular slot portion,
    and means to accelerate the flow of the gaseous mixture through the gas entry portion and out through the throat of each of said slots.

2. The device of claim 1, wherein the chamber is cylindrical in shape and is formed of a plurality of coaxially supported annular elements spaced from and in parallel with each other defining a series of orifice slots therebetween, the annular elements being contoured such that an annular element relative to its next adjacent annular element defines a circumferential orifice slot through the wall of said chamber, having said enlarged gas portion which extends and converges into said reduced throat.

3. The device of claim 1, wherein the means to accelerate comprises means for establishing a uniform pressure difference between the inside and the outside of said chamber.

4. The device of claim 1, wherein the width of the opening of the throat is approximately 3 millimeters.

5. A device for separating entrained dusts and mists from a gaseous stream which comprises;
a chamber for receiving a mixture of a suspended washing liquid and said gaseous stream,
a plurality of adjacently spaced elongated orifice slots passing through the wall of said chamber, each of said orifice slots being characterized by an enlarged gas entry portion which extends and converges into a reduced throat of a width of from 0.02 to 3 millimeters, the axis of said converging gas entry portion and said throat being coextensively linear, the length of the converging gas entry portion of each of the slots terminating at the reduced throat ranging from about 1 to 10 millimeters, and means for introducing said mixture of suspended washing liquid and said gaseous stream into said chamber equidirectional with respect to all portions of said slots whereby there is no directional tendency of said mixture towards any particular slot portion, and
means to accelerate the flow of the gaseous mixture through the gas entry portion and out through the throat of each of said slots whereby to cause the entrained dusts, mists and suspended washing liquid to agglomerate into heavier particles.

6. The device of claim 5, further comprising an outer chamber embracing said chamber, and means associated with said outer chamber for removing the cleansed gas as the agglomerated liquid and heavier particles settle out within said outer chamber and are discharged.

7. The device of claim 6, wherein the means for establishing the mixture within the inner chamber includes:
a duct for directing the gaseous stream into said inner chamber, and
liquid spray means associated with said duct for suspending liquid in said gaseous stream.

8. The device of claim 7, wherein is included means for recovering agglomerated heavier particles collected within said outer chamber.

9. The device of claim 5, wherein the width of the opening of the throat is approximately 3 millimeters.

10. The device of claim 6, wherein the inner chamber is cylindrical in shape and is formed of a plurality of coaxially supported annular elements spaced in parallel from each other and defining orifice slots therebetween, the annular elements being contoured such that an annular element relative to its next adjacent annular element defines a circumferential orifice slot around the wall of said inner chamber having said enlarged gas entry portion which extends and converges into said reduced throat.

11. The device of claim 5, wherein the length of the converging gas entry portion is approximately 3 millimeters.

12. The device of claim 5, wherein said throat of each of said slots terminates into a divergent portion.

13. A method for separating entrained dusts and mists from a gaseous stream which comprises:
spraying a washing liquid into said gaseous stream to form a gas-spray mixture moving in a predetermined direction, accelerating the flow of the gas-spray mixture to a speed of about 30 to 250 meters per second through an orifice slot characterized by an enlarged gas entry portion which extends and converges over a distance of about 1 to 10 millimeters into a reduced throat portion of a width of from 0.02 to 3 millimeters, the axis of said converging gas entry portion and said throat being coextensively linear, being substantially perpendicular to said predetermined direction, whereby there is no directional tendency of said mixture towards any particular orifice slot portion, and whereby the entrained dusts, mists and spray liquid are caused to collide and agglomerate into heavier particles while passing through the reduced throat portion and allowing said mixture to decrease in speed as it leaves the throat portion, whereby to allow the agglomerated heavier particles to fall out of said mixture.

14. The method of claim 13, wherein the gas-spray mixture is accelerated to a speed of about 50 to 150 meters per second.

15. A method of removing a gas from a gaseous stream which comprises:
spraying a liquid having an affinity for the gas to be removed into said gaseous stream to form a gas-spray mixture moving in a predetermined direction,
accelerating the flow of the gas-spray mixture to a speed of about 30 to 250 meters per second through an orifice slot characterized by an enlarged gas entry portion which extends and converges over a distance of about 1 to 10 millimeters into a reduced throat portion of a width of from 0.02 to 3 millimeters, the axis of said converging gas entry portion and said throat being coextensively linear, being substantially perpendicular to said predetermined direction, whereby there is no directional tendency of said mixture towards any particular orifice slot portion and whereby the gas is extensively exposed to and caused to collide with the droplets of the liquid spray and combine with the additive while passing through the reduced throat portion, and allowing said mixture to decrease in speed as it leaves the throat portion, whereby to allow the combined liquid and absorbed gas to fall out of the gaseous stream.

16. The method of claim 15, wherein the gas-spray mixture is accelerated to a speed of about 50 to 150 meters per second and passed through a slot having a throat width of about 0.02 to 3 millimeters.